United States Patent
Jeong et al.

(10) Patent No.: US 7,866,190 B2
(45) Date of Patent: Jan. 11, 2011

(54) WASHING MACHINE HAVING BROADCASTING RECEIVER

(75) Inventors: Seong Hae Jeong, Changwon-si (KR); Soung Bong Choi, Changwon-si (KR); Deug Hee Lee, Gimhae-si (KR); Hyeok Deok Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 11/667,996

(22) PCT Filed: Jun. 28, 2006

(86) PCT No.: PCT/KR2006/002505
§ 371 (c)(1),
(2), (4) Date: Dec. 20, 2007

(87) PCT Pub. No.: WO2007/004808
PCT Pub. Date: Jan. 11, 2007

(65) Prior Publication Data
US 2008/0105001 A1    May 8, 2008

(30) Foreign Application Priority Data

| Jun. 30, 2005 | (KR) | ............... 10-2005-0057656 |
| Jun. 30, 2005 | (KR) | ............... 10-2005-0057657 |
| Jun. 30, 2005 | (KR) | ............... 10-2005-0057658 |
| Jun. 30, 2005 | (KR) | ............... 10-2005-0057662 |
| Jun. 30, 2005 | (KR) | ............... 10-2005-0057823 |

(51) Int. Cl.
*D06F 33/02* (2006.01)

(52) U.S. Cl. ..................... 68/3 R; 68/13 R

(58) Field of Classification Search ............ 68/12.27; 134/113
See application file for complete search history.

(56) References Cited

U.S. PATENT DOCUMENTS 3,402,576 A * 9/1968 Krupsky .................... 68/4
5,839,097 A * 11/1998 Klausner ............. 340/825.69

(Continued)

FOREIGN PATENT DOCUMENTS

CN    1490579    4/2004

(Continued)

OTHER PUBLICATIONS

European Patent Office 0 513 688, Nov. 1992.*

*Primary Examiner*—Frankie L Stinson
(74) *Attorney, Agent, or Firm*—McKenna Long & Aldridge LLP

(57) ABSTRACT

A washing machine having a broadcasting receiver for providing various multimedia contents on the washing machine is disclosed. A broadcast signal reception module is provided in the washing machine, such as a washer or dryer, which is frequently used in the user's living space. Therefore, the washing machine can not only perform a washing operation, but also output a broadcast signal. In particular, the provision of the broadcast signal reception module in the washing machine enables reception of a mobile broadcast signal, as well as a fixed broadcast signal, thereby making it possible to provide more various multimedia contents through the washing machine. Therefore, it is possible to increase customer satisfaction with a multifunction-alization of the washing machine and thus use the washing machine more universally, resulting in an increase in the competitiveness of a product.

31 Claims, 6 Drawing Sheets

U.S. PATENT DOCUMENTS

| | | | |
|---|---|---|---|
| 6,097,441 A * | 8/2000 | Allport | 348/552 |
| 6,480,753 B1 * | 11/2002 | Calder et al. | 700/83 |
| 6,587,739 B1 | 7/2003 | Abrams et al. | |
| 6,853,308 B1 * | 2/2005 | Dustin | 340/825.69 |
| 6,853,399 B1 * | 2/2005 | Gilman et al. | 348/61 |
| 6,934,592 B2 * | 8/2005 | Hood et al. | 700/83 |
| 7,042,366 B1 * | 5/2006 | Mui et al. | 340/825.25 |
| 7,110,836 B2 * | 9/2006 | Sturm et al. | 700/83 |
| 7,216,514 B2 * | 5/2007 | Sakita et al. | 68/12.12 |
| 2003/0093812 A1 * | 5/2003 | Chang et al. | 725/133 |
| 2004/0098746 A1 * | 5/2004 | Lee et al. | 725/80 |
| 2004/0156170 A1 * | 8/2004 | Mager et al. | 361/683 |
| 2005/0109070 A1 | 5/2005 | Kobayashi et al. | |
| 2005/0210120 A1 * | 9/2005 | Yukie et al. | 709/217 |

FOREIGN PATENT DOCUMENTS

| | | | |
|---|---|---|---|
| DE | 38 05 032 | * | 8/1989 |
| EP | 0075026 A1 | | 3/1983 |
| EP | 1028604 A2 | | 8/2000 |
| JP | 02-176697 | * | 7/1990 |
| JP | 05-137882 | * | 6/1993 |
| JP | 09-027993 | * | 1/1997 |
| JP | 09-172689 | * | 6/1997 |
| JP | 10-201984 | * | 8/1998 |
| JP | 2003-163980 | * | 6/2000 |
| JP | 2003-225491 | * | 8/2003 |
| JP | 2004-211504 | * | 7/2004 |
| KR | 2001096951 | * | 4/2001 |

* cited by examiner

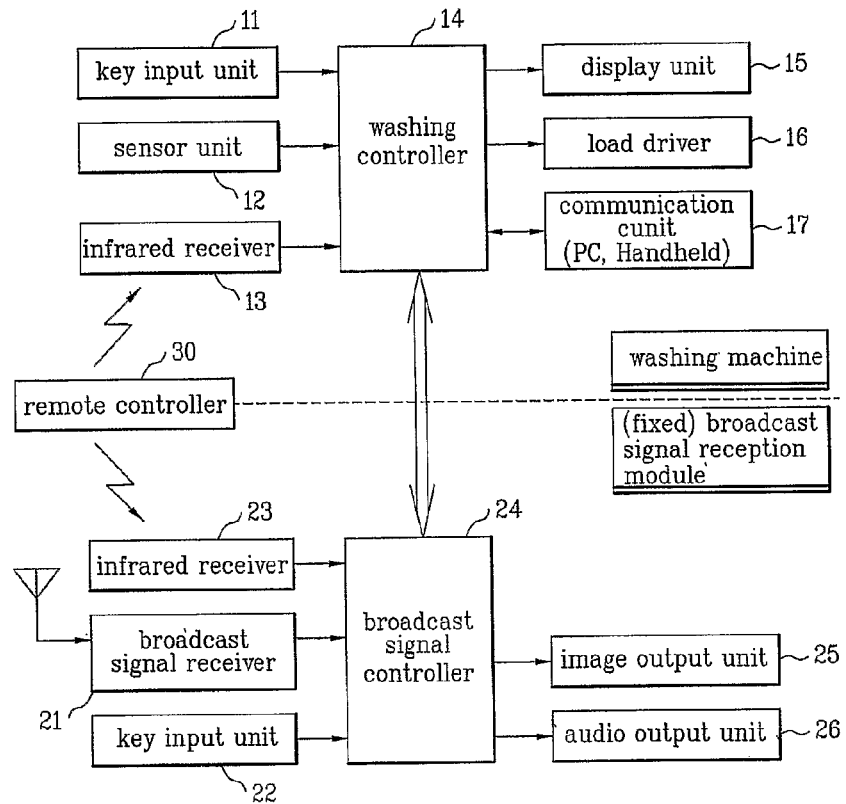
[Fig. 1]
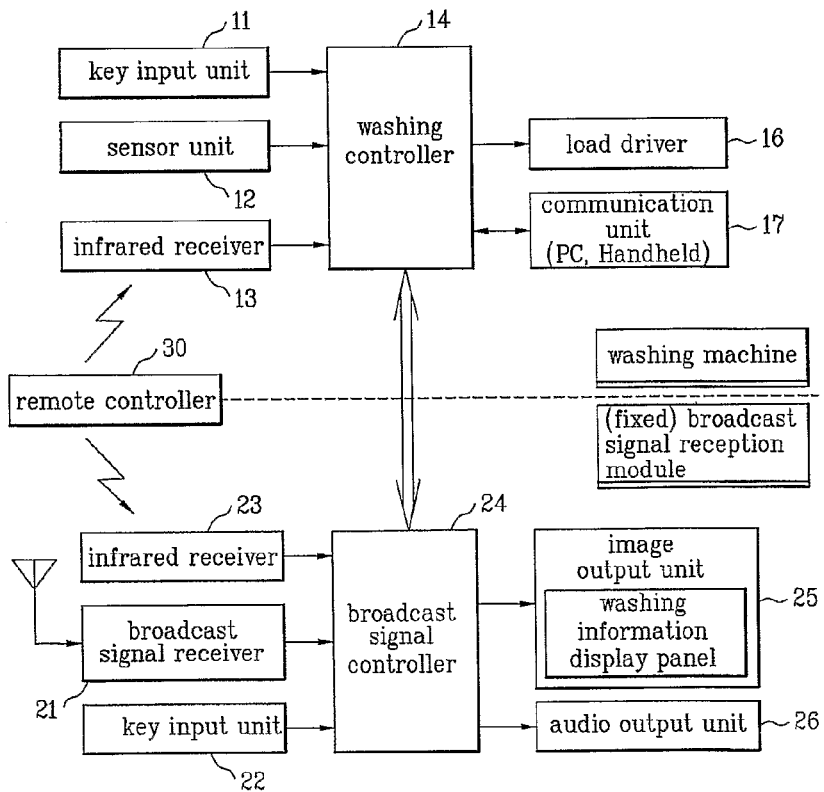
[Fig. 2]

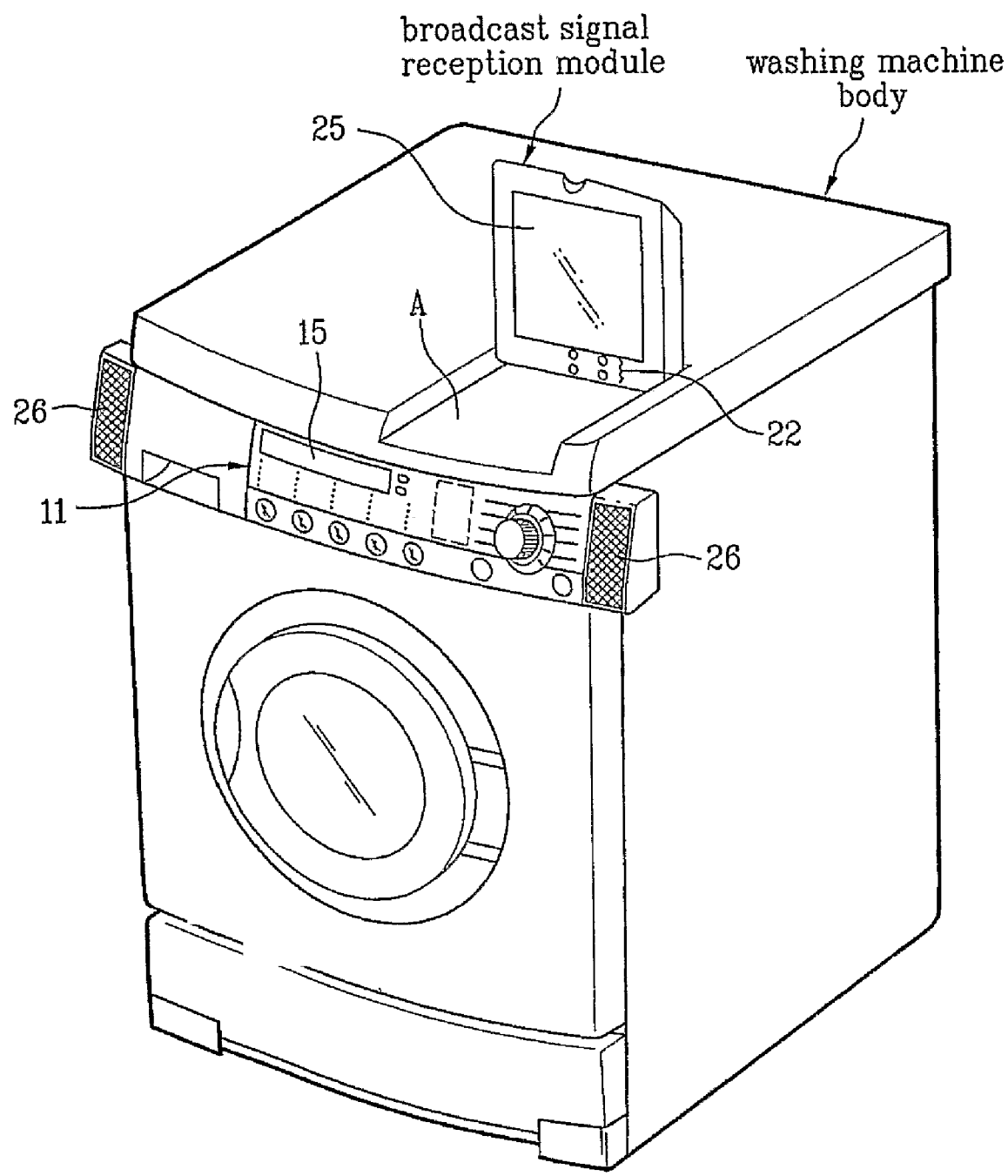
[Fig. 3]

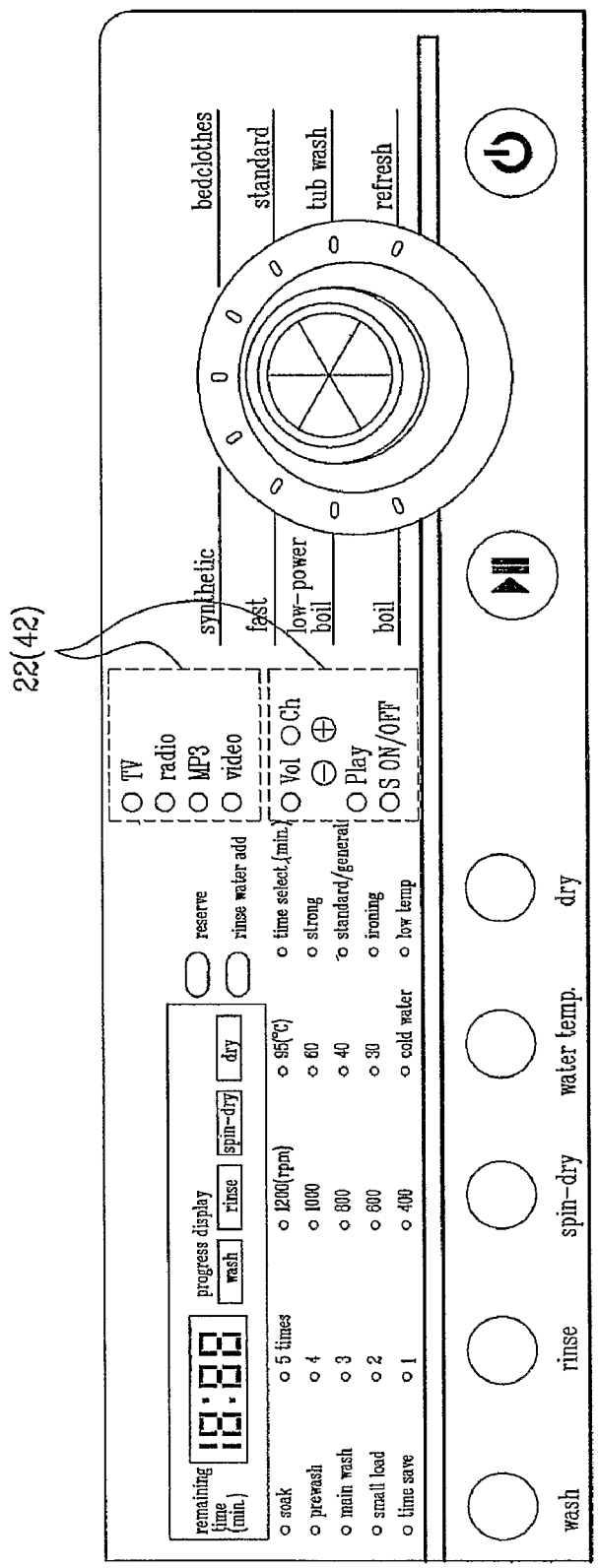
[Fig. 4]

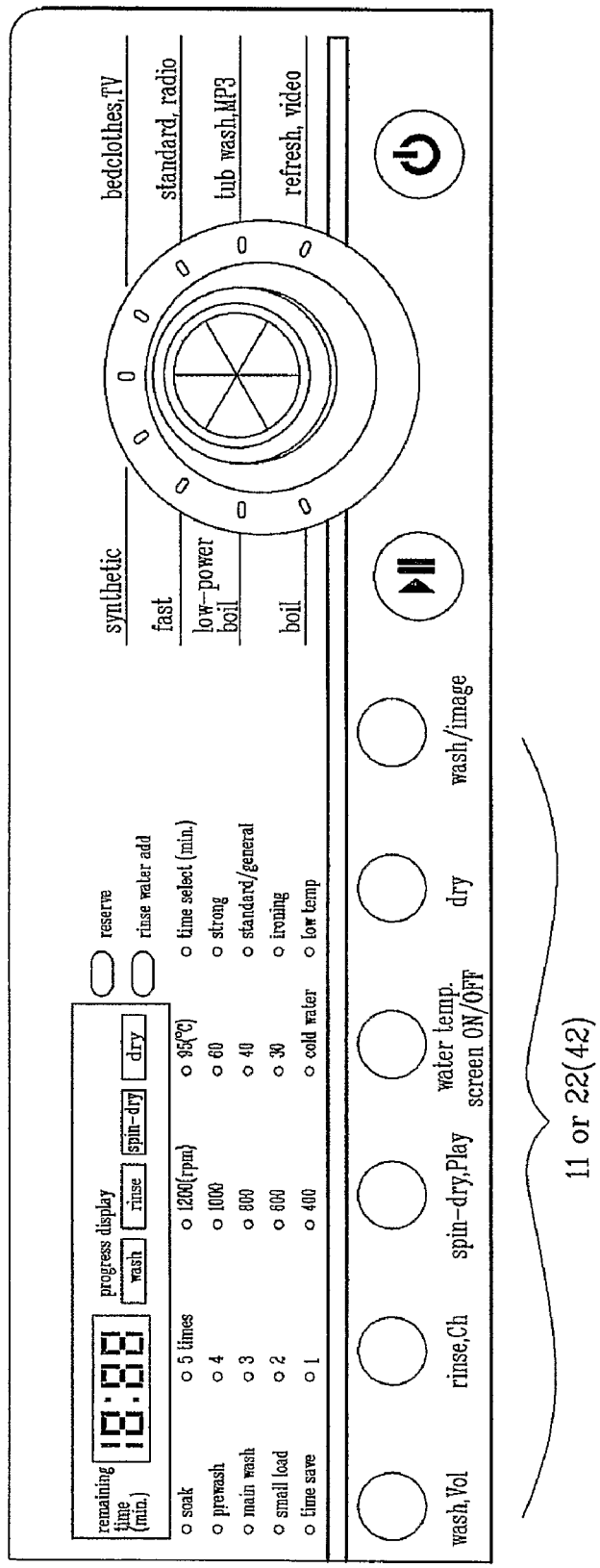
[Fig. 5]

[Fig. 6]
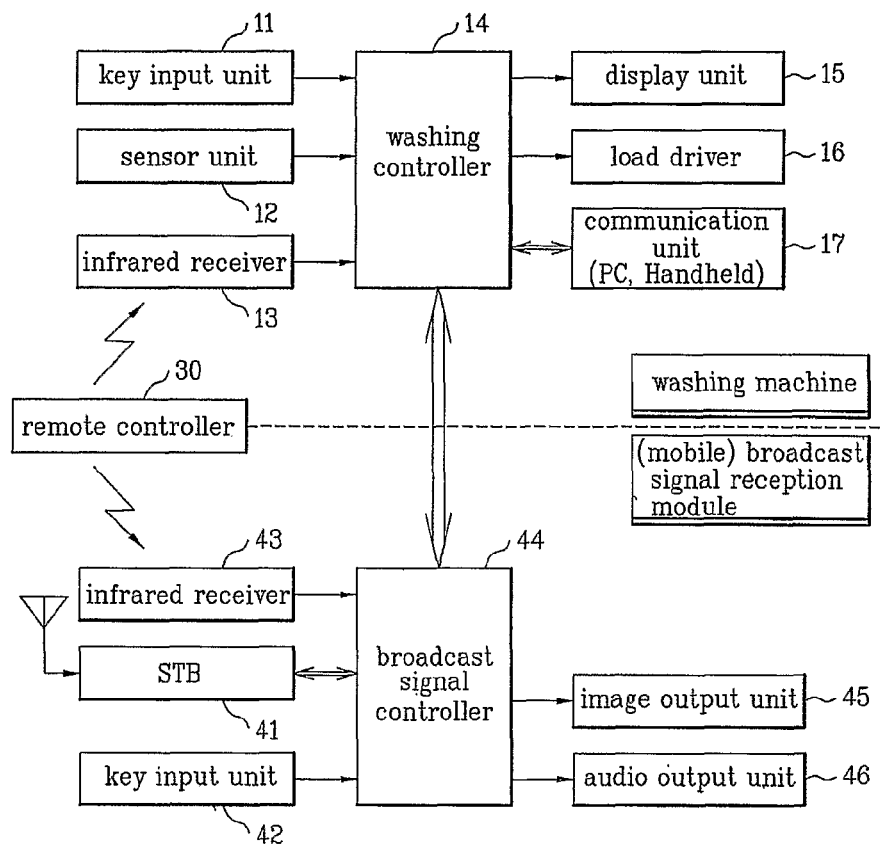
[Fig. 7]
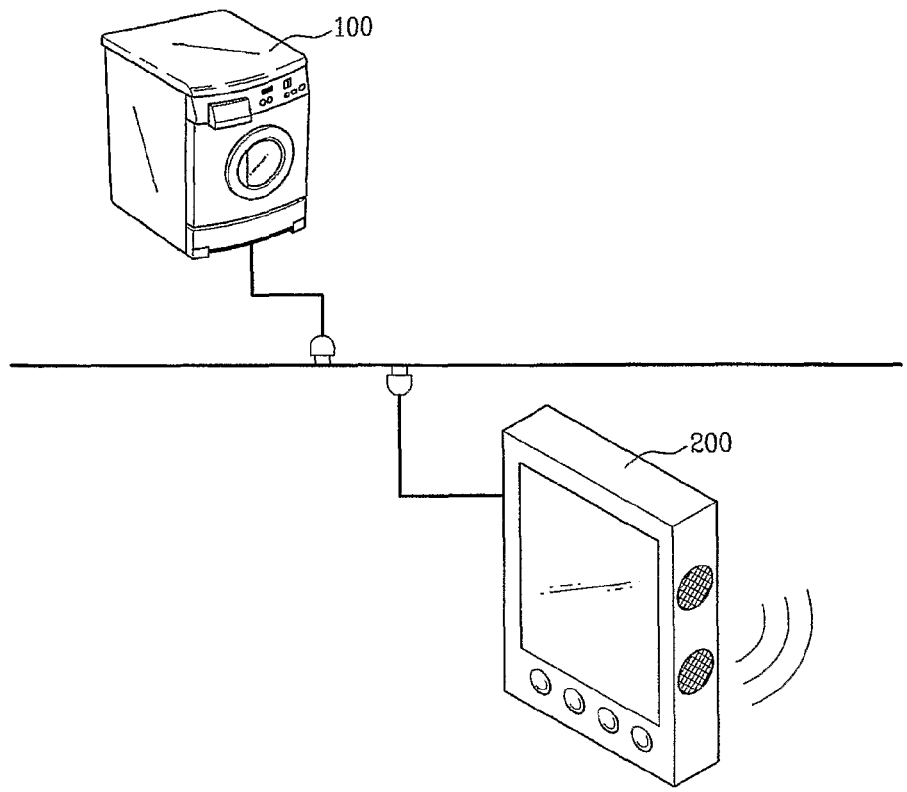

[Fig. 8]
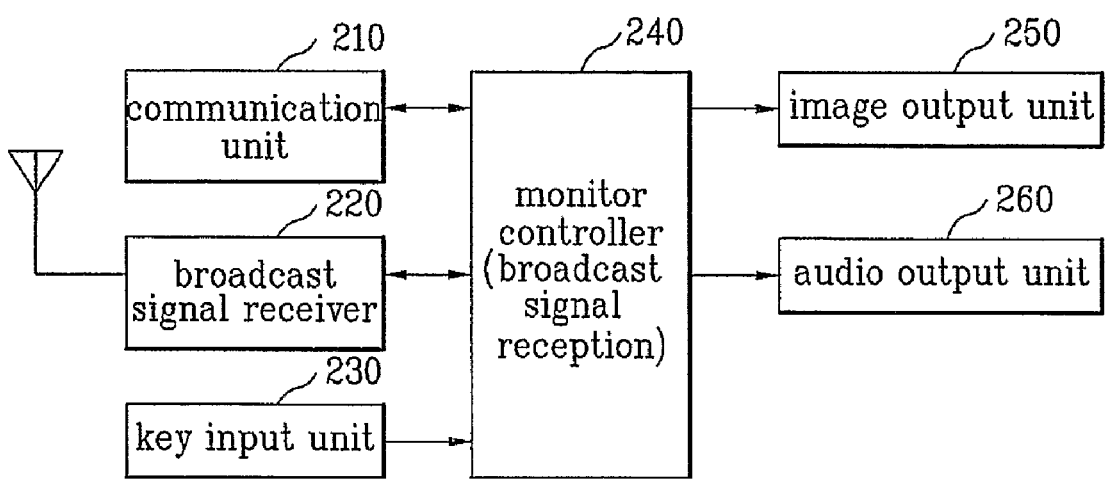

WASHING MACHINE HAVING BROADCASTING RECEIVER

This application claims the benefit of Korean Patent Application No. 10-2005-0057656, filed on Jun. 30, 2005; Korean Patent Application No. 10-2005-0057657, filed on Jun. 30, 2005; Korean Patent Application No. 10-2005-0057658, filed on Jun. 30, 2005; Korean Patent Application No. 10-2005-57662, filed on Jun. 30, 2005; Korean Patent Application No. 10-2005-0057823, filed on Jun. 30, 2005 and PCT Application No. PCT/KR2006/002505, filed on Jun. 28, 2006, which is hereby incorporated by reference for all purposes as if fully set forth herein.

TECHNICAL FIELD

The present invention relates to a washing machine, and more particularly, to a washing machine having a broadcasting receiver for providing various multimedia contents on the washing machine.

BACKGROUND ART

In general, washing machines are roughly classified into a washer which washes clothes, a dryer which dries clothes, and a washer with a drying function which performs both washing and drying of clothes.

The washer is a home appliance which cleans laundry by removing contaminants attached to the laundry using a softening action of detergent, a frictional action of wash water flows resulting from a rotational action, an impact of the wash water flows applied to the laundry, etc.

The dryer is a home appliance which automatically dries wet clothes after being washed, and is classified into a dehumidifying type and an exhausting type according to a drying method. Recently, the demand for the dryer is on an increasing trend.

Nowadays, customer concerns and desires for upgradation of home appliances are increasing. For this reason, in spite of the repeated development of washing machines for the user's convenience as mentioned above, it is next to impossible to expect that the customers will be satisfied with only the existing washing machines.

Recently, in a home appliance field, a multifunctionalization to integrate composite functions in one product is being attempted, as well as a high functionalization to improve the original function of the product.

These attempts are contrary evidence that the home appliance market has been saturated, but results of efforts to provide more excellent and convenient products through continuous technical development.

DISCLOSURE OF INVENTION

Technical Problem

However, for the aforementioned washing machines, the user requires a higher technique than is currently possible, resulting in an increase in product costs of the washing machines and, in turn, a limitation in universal use thereof. In this regard, at present, there is a need for a new technique capable of readily acquiring various information even at low cost.

Meanwhile, a radio, television or the like may be sometimes installed in a separate place (for example, in a washing room, on the wall of a bathroom, or in the vicinity of a shelf of a kitchen). In this case, the radio, television or the like must not only have a separate module, power supply means, etc., but also be small in size due to a spatial restriction.

Technical Solution

An object of the present invention devised to solve the problem lies on a washing machine having a broadcasting receiver which can significantly increase customer satisfaction with a multifunctionalization thereof and be universally used at a lower cost.

The object of the present invention can be achieved by providing a broadcasting receiver-equipped washing machine for washing or drying laundry, the washing machine comprising a broadcast signal reception module arranged thereon for receiving a broadcast signal and providing the received broadcast signal in image and audio form.

The washing machine may further comprise a remote controller for inputting control commands from a user to the washing machine and broadcast signal reception module.

The washing machine and the broadcast signal reception module may be interconnected via a serial communication line so that they can perform data communication therebetween.

Preferably, the washing machine includes: a key input unit for inputting washing mode conditions from a user; a load driver for driving loads necessary for a washing mode; a display unit for displaying current mode conditions in progress and a current washing progress state; and a washing controller for controlling the washing mode according to the washing mode conditions inputted from the user, and transmitting information regarding the current washing progress state to the broadcast signal reception module to display the current washing progress state through the broadcast signal reception module.

The washing machine may further include an Internet-connectable communication unit.

Preferably, the broadcast signal reception module includes: a key input unit for inputting control commands for control of image/audio output from a user; a broadcast signal receiver for receiving an external fixed broadcast signal and separating the received broadcast signal into a video signal and an audio signal; an image output unit for displaying the video signal separated by the broadcast signal receiver and a current washing progress state of the washing machine; an audio output unit for outputting the audio signal separated by the broadcast signal receiver; and a broadcast signal controller for controlling the image/audio output in response to the user's control commands and displaying the washing progress state through the image output unit in data communication with the washing machine.

Alternatively, the broadcast signal reception module may include: a key input unit for inputting control commands for control of image/audio output from a user; a set-top box for receiving an external mobile broadcast signal and separating the received broadcast signal into a video signal and an audio signal; an image output unit for displaying the video signal separated by the set-top box and a current washing progress state of the washing machine; an audio output unit for outputting the audio signal separated by the set-top box; and a broadcast signal controller for controlling the image/audio output in response to the user's control commands and displaying the washing progress state through the image output unit in data communication with the washing machine.

The set-top box may have a data transmission/reception function to enable two-way communication with a transmission center which provides the mobile broadcast signal.

Preferably, the set-top box includes: a tuner for receiving, tuning and demodulating the mobile broadcast signal from a broadcasting transmission center; and a demultiplexer for separating the mobile broadcast signal demodulated by the tuner into the video signal and the audio signal.

The set-top box may further include a storage medium for storing the received mobile broadcast signal.

The image output unit may include a washing information display panel for displaying only the washing progress state separately from the video signal.

In this case, the image output unit may be physically partitioned into an image display area for outputting the video signal, and a washing display area for displaying the washing progress state, whereby the image output unit displays the video signal and the washing progress state independent of each other.

Alternatively, the image output unit may have a single display panel for outputting both the video signal and washing progress state, the single display panel being functionally partitioned into an image display area for displaying the video signal, and a washing display area for displaying the washing progress state.

In this case, the image output unit may display the washing progress state in the form of a PIP screen or caption together with the video signal under the control of the broadcast signal controller.

Preferably, the key input unit includes: a washing operator for performing a variety of washing-associated operations; and a broadcasting operator for performing various operations associated with output of the broadcast signal.

In another aspect of the present invention, provided herein is a broadcasting receiver-equipped washing machine for washing or drying laundry, the washing machine comprising a monitor device communicably connected therewith for remotely controlling and monitoring an entire operation of the washing machine, the monitor device receiving a broadcast signal and outputting the received broadcast signal in image and audio form, in response to a user's request.

Preferably, the monitor device includes: a communication unit for transmitting a control command to the washing machine or receiving information regarding a current washing progress state of the washing machine therefrom in data communication with the washing machine; a broadcast signal receiver for receiving an external broadcast signal and separating it into a video signal and an audio signal; an image output unit for displaying the washing progress state information received through the communication unit and the video signal separated by the broadcast signal receiver; an audio output unit for outputting the washing progress state information received through the communication unit and the audio signal separated by the broadcast signal receiver; and a monitor controller for outputting the washing progress state information or broadcast signal by performing the data communication with the washing machine or a broadcast signal reception function in response to a control command from the user.

The washing machine and the monitor device may perform the data communication therebetween in any one of a power line communication (PLC) manner or radio frequency (RF) communication manner.

The communication unit may include any one of a PLC module or RF communication module.

The monitor device may further include a key input unit, the key input unit including a washing operator for performing a variety of washing-associated operations, and a broadcasting operator for performing various operations associated with output of the broadcast signal.

The image output unit may include a washing information display panel for displaying only the washing progress state separately from the video signal. In this case, the image output unit may be physically partitioned into an image display area for outputting the video signal, and a washing display area for displaying the washing progress state, whereby the image output unit displays the video signal and the washing progress state independent of each other.

Alternatively, the image output unit may have a single display panel for outputting both the video signal and washing progress state, the single display panel being functionally partitioned into an image display area for displaying the video signal, and a washing display area for displaying the washing progress state. In this case, the image output unit may display the washing progress state in the form of a PIP screen or caption together with the video signal under the control of the monitor controller.

The broadcast signal received by the broadcast signal receiver may be a fixed broadcast signal or mobile broadcast signal.

The monitor device may further include a storage medium for storing the broadcast signal received by the broadcast signal receiver.

ADVANTAGEOUS EFFECTS

A broadcasting receiver-equipped washing machine according to the present invention has effects as follows.

A broadcast signal reception module is provided in the washing machine, such as a washer or dryer, which is frequently used in the user's living space. Therefore, the washing machine can not only perform a washing operation, but also output a broadcast signal.

In particular, the provision of the broadcast signal reception module in the washing machine enables reception of a mobile broadcast signal, as well as a fixed broadcast signal, thereby making it possible to provide more various multimedia contents through the washing machine.

Therefore, it is possible to increase customer satisfaction with a multifunctionalization of the washing machine and thus use the washing machine more universally, resulting in an increase in the competitiveness of a product.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a block diagram showing a first embodiment of a washing machine according to the present invention, in which a washing machine body and a fixed broadcast signal reception module employ individual display means, respectively.

FIG. 2 is a block diagram showing a second embodiment of the washing machine according to the present invention, in which the washing machine body and the fixed broadcast signal reception module employ single display means in common.

FIG. 3 is a perspective view showing a state of an image output unit of the washing machine according to the present invention, taken for use thereof.

FIG. 4 and FIG. 5 illustrate the states of first and second embodiments of a control panel (key input unit) of the washing machine according to the present invention.

FIG. 6 is a block diagram showing a third embodiment of the washing machine according to the present invention, which has a mobile broadcast signal reception module.

FIG. 7 is a perspective view showing a fourth embodiment of the washing machine according to the present invention, which has a monitor device with a broadcast signal reception function.

FIG. 8 is a block diagram showing the configuration of the monitor device with the broadcast signal reception function.

BEST MODE FOR CARRYING OUT THE INVENTION

Reference will now be made in detail to the preferred embodiments of the present invention, examples of which are illustrated in the accompanying drawings.

A washing machine applicable to the present invention may be a washer, a dryer, a washer having a drying function, or the like.

FIG. 1 is a block diagram showing a first embodiment of a washing machine according to the present invention, in which a washing machine body and a broadcast signal reception module employ individual display means, respectively, and FIG. 2 is a block diagram showing a second embodiment of the washing machine according to the present invention, in which the washing machine body and the broadcast signal reception module employ single display means in common.

Here, the broadcast signal reception module shown in FIG. 1 and FIG. 2 is configured to receive a fixed broadcast signal.

The washing machine according to the present invention is a broadcasting receiver-equipped washing machine with a broadcast signal reception function. In the washing machine, the washing machine body is provided to wash or dry clothes, and the broadcast signal reception module is arranged on the washing machine body to receive a broadcast signal and provide the received broadcast signal in image and audio form.

As shown in FIG. 1 and FIG. 2, the washing machine body is adapted to perform a washing mode for laundry put therein by the user. To this end, the washing machine body includes a key input unit 11 for inputting various washing mode conditions from the user, a sensor unit 12 for sensing various mode states, such as the amount of laundry, the level of wash water, the temperature of wash water and the rotation speed of a motor, required in the washing mode, a load driver 16 for driving loads (a feed/drain valve, motor, etc.) necessary for the washing mode, and a washing controller 14 for controlling the entire operation of the washing mode according to the washing mode conditions inputted through the key input unit 11 and the mode states sensed by the sensor unit 12.

The washing machine body further includes an Internet-connectable communication unit 17 (for example, a personal computer (PC), handheld device or the like). The communication unit 17 enables the user to use, over the Internet, a variety of services including downloading washing course programs.

A display unit 15 is provided in the washing machine body to display washing-associated information of the washing machine body, as shown in FIG. 1. The display unit 15 functions to display the washing-associated information, which includes current mode conditions in progress, a current washing progress state, etc.

Alternatively, one display means may be provided and used in common in the washing machine body and the broadcast signal reception module. For example, display means of the broadcast signal reception module may also act to perform a display function of the washing machine body.

That is, as shown in FIG. 2, the washing-associated information of the washing machine body may be displayed by virtue of an image output unit 25, which is display means of the broadcast signal reception module, through communication between the washing machine body and the broadcast signal reception module, without separately constructing the display unit 15 of FIG. 1 in the washing machine body.

As shown in FIG. 1 and FIG. 2, the broadcast signal reception module, which is a fixed broadcast signal reception module, is adapted to receive a fixed broadcast signal provided from a broadcasting station. To this end, the broadcast signal reception module includes a key input unit 22 for inputting control commands for control of image/audio output, including power on/off, channel selection, volume adjustment, etc., from the user, a broadcast signal receiver 21 for receiving an external broadcast signal and separating the received broadcast signal into a video signal and an audio signal, an image output unit 25 for displaying the separated video signal and the washing-associated information of the washing machine body, an audio output unit 26 for outputting the separated audio signal, and a broadcast signal controller 24 for controlling the image/audio output in response to the user's control commands inputted through the key input unit 22.

Preferably, the washing controller 14 and the broadcast signal controller 24 are interconnected via a serial communication line such that data communication is enabled between the washing machine body and the broadcast signal reception module.

In the present embodiments, the broadcast signal reception module is installed in the side or top plate of a cabinet constituting the outer appearance of the washing machine body in a folded manner.

Preferably, as shown in FIG. 3, a recess A is formed on the outer surface of the washing machine body to receive the broadcast signal reception module, and the broadcast signal reception module is hingeably coupled with the recess A such that it is selectively received in the recess A.

That is, the broadcast signal reception module is arranged in such a manner that it can be folded into the recess A. For use, the broadcast signal reception module is hingeably moved to an upright position thereof such that it is exposed externally of the receiver A. For custody, the broadcast signal reception module is hingeably moved to a folded position thereof such that it is received internally of the receiver A.

Here, the audio output unit 26 of the broadcast signal reception module may be installed in a place outside of the washing machine body for spatial utilization thereof.

It should be noted here that the image output unit 25 of the broadcast signal reception module is used as display means of the washing machine body, as well as means for displaying an image of a broadcast signal.

The image output unit 25 has a display panel for displaying an image of a broadcast signal, and a display panel for displaying washing-associated information. Thus, the broadcast signal controller 24 displays a video signal and washing-associated information on the corresponding display panels independent of each other without performing a separate signal process.

Alternatively, the image output unit 25 may have a single display panel which is functionally partitioned into an image display area for displaying an image of a broadcast signal, and a washing display area for displaying washing-associated information. In this case, the broadcast signal controller 24 mixes a video signal and washing-associated information to be displayed, to display them together.

Preferably, the image output unit 25 includes a display unit composed of a display device, such as a liquid crystal display (LCD) or plasma display panel (PDP).

The key input unit 11 of the washing machine body is input means which is provided on an upper portion of the body to input a variety of washing-associated operations. Alternatively, the key input unit 11 may formed integrally with the key input unit 22 of the broadcast signal reception module to constitute a single control panel.

As shown in FIG. 4, the control panel includes a washing operator (this means the key input unit 11) for performing a variety of washing-associated operations, and a broadcasting operator (this means the key input unit 22) for performing various operations associated with output of a broadcast signal.

The washing operator includes a plurality of operating buttons and an operating dial for setting of respective operations of various modes, adjustment of a wash water temperature, drying temperature, etc., and selection of an operation speed, washing course, etc.

The broadcasting operator includes a plurality of operating buttons for selection of use environments of the broadcast signal reception module, such as power ON/OFF, channel selection, volume adjustment, and screen adjustment.

Alternatively, as shown in FIG. 5, whereas the washing operator and the broadcasting operator constitutes a single control panel, two functions may be set in each operating button so that each operating button can be used in common in the washing operator and broadcasting operator.

To this end, a mode select key is provided for selection of any one of a washing operation mode for a washing-associated operation or a broadcasting operation mode for operation of the broadcast signal reception module.

The mode select key is toggled in response to every key input to alternately select the washing operation mode and the broadcasting operation mode.

According to the mode selected by the mode select key, the operating buttons of the control panel perform washing-associated operations, such as Wash, Rinse, Spin-Dry, Water Temperature and Dry, or broadcasting-associated operations, such as Volume, Channel, Play and Screen ON/OFF.

With this configuration, the washing controller 14 selectively controls the washing operation and/or broadcast signal output in response to a signal inputted through the key input unit 11.

In the present embodiments, the washing machine further comprises a remote controller 30 for inputting control commands to the washing machine body and broadcast signal reception module. A key panel for control of the washing machine body and a key panel for control of the broadcast signal reception module are together provided in the remote controller 30 so that the remote controller 30 can be used for both the washing machine body and broadcast signal reception module.

A code format of the washing machine body and a code format of the broadcast signal reception module are together provided in the remote controller 30 so that the remote controller 30 can transmit a key code based on the corresponding code format of a key panel operated by the user.

The washing machine body and the broadcast signal reception module further include infrared receivers 13 and 23, respectively. Each of the infrared receivers 13 and 23 acts to receive a key code transmitted from the remote controller 30.

With this configuration, the infrared receivers 13 and 23 receive key codes transmitted from the remote controller 30 and transfer the received key codes to the washing controller 14 and broadcast signal controller 24, respectively. At this time, the washing controller 14 and broadcast signal controller 24 recognize only key codes of the code formats corresponding thereto.

A description will hereinafter be given of the operations of the first and second embodiments of the washing machine with the broadcast signal (for example, a TV signal) reception function according to the present invention, constructed as stated above.

First, in the washing machine body, the washing controller 14 controls the load driver 16 to drive loads necessary for the washing mode in consideration of washing mode conditions inputted by the user or mode states sensed by the sensor unit 12.

At this time, in the case where the display unit 15 is separately provided in the washing machine body, the washing controller 14 displays current mode conditions in progress or a current washing progress state through the display unit 15. Further, the washing controller 14, in communication with the broadcast signal controller 24, determines the state of the broadcast signal reception module and then transfers information regarding the current washing progress state to the broadcast signal controller 24 when the broadcast signal reception module is in a stand-by mode or an image/audio output state.

Alternatively, in the case where the image output unit 25 of the broadcast signal reception module is used as common display means as shown in FIG. 2, the washing controller 14 transfers the current washing progress state information to the broadcast signal reception module in real time in communication with the broadcast signal controller 24.

Meanwhile, in the broadcast signal reception module, if the user, through the key input unit 22, powers on the broadcast signal reception module and then selects a desired channel to be watched, the broadcast signal receiver 21 receives a fixed broadcast signal of the selected channel, separates the received broadcast signal into a video signal and an audio signal and outputs the separated video and audio signals.

Thereafter, the broadcast signal controller 24 receives the video signal and audio signal from the broadcast signal receiver 21, processes the received signals into signals that can be outputted, and outputs the processed signals to the image output unit 25 and audio output unit 26, respectively.

The broadcast signal controller 24 also receives the washing progress state information of the washing machine body in communication with the washing controller 14 and processes the received washing progress state information into a signal that can be outputted to the image output unit 25.

At this time, when the broadcast signal reception module is in the stand-by mode, the broadcast signal controller 24 displays only the washing progress state information on a specific display area of the image output unit 25. However, when the broadcast signal reception module is in a video signal output state, the broadcast signal controller 24 mixes a video signal with the washing progress state information to output them together.

For example, provided in a display area of the image output unit 25 may be a picture in picture (PIP) function which configures the video signal as a main picture and the washing progress state information as a sub-picture.

Alternatively, a caption area may be provided under the display area of the image output unit 25 to display the washing progress state information in the form of a caption.

For the display of the washing progress state using the image output unit 25, the broadcast signal controller may successively display the washing progress state information by communicating with the washing machine body in real time, or selectively display the washing progress state information by communicating with the washing machine body only when there is a request from the user.

As stated above, in the present embodiments, the broadcast signal reception module which receives a fixed broadcast signal is installed in the washing machine. Therefore, the user can watch a broadcast easily even in a space where the washing machine is positioned.

FIG. 6 is a block diagram showing a third embodiment of the broadcasting receiver-equipped washing machine according to the present invention, which has a broadcast signal reception module for receiving a mobile broadcast signal, such as a digital multimedia broadcasting (DMB) signal.

The washing machine body of the present embodiment is the same in configuration as those of the above-stated embodiments. The broadcast signal reception module of the present embodiment is adapted to receive a mobile broadcast signal from a broadcasting transmission center of a satellite or terrestrial base station and provide various multimedia contents including an image, audio, etc. To this end, the broadcast signal reception module includes a key input unit 42 for inputting control commands associated with a multimedia broadcasting service from the user, a set-top box 41 for receiving the mobile broadcast signal from the broadcasting transmission center and separating the received broadcast signal into a video signal and an audio signal, an image output unit 45 for displaying the separated video signal, an audio output unit 46 for outputting the separated audio signal, and a broadcast signal controller 44 for processing the video signal and audio signal separated by the set-top box 41 into signals that can be outputted through the video output unit 45 and audio output unit 46, respectively.

The set-top box 41 includes a tuner (not shown) for receiving, tuning and demodulating the mobile broadcast signal from the broadcasting transmission center, and a demultiplexer (not shown) for separating the mobile broadcast signal demodulated by the tuner into the video signal and the audio signal.

The broadcast signal controller 44 includes a video processor (not shown) for processing the video signal from the set-top box 41 into the signal that can be displayed through the image output unit 45, and an audio processor (not shown) for processing the audio signal from the set-top box 41 into the signal that can be outputted through the audio output unit 46.

The broadcast signal reception module with this configuration is installed in the washing machine body in the same manner as that in FIG. 3.

Preferably, the broadcast signal reception module is a terminal which includes a data transmission/reception function to enable two-way communication with the broadcasting transmission center, and can receive various multimedia contents provided from the broadcasting transmission center, or request a desired service therefrom in the user's place.

For example, the broadcast signal reception module may receive various multimedia contents (program/non program associated data) including video, music, stock market information, traffic information, etc. from the broadcasting transmission center according to the user's request.

The broadcast signal reception module may further include a storage medium for storing multimedia contents received from the broadcasting transmission center.

In this case, the storage medium may be a hard disk drive, an internal flash memory, or a mobile extensible flash memory device (a MultiMedia Card (MMC) memory, a Compact Flash (CF) memory, a smart media memory, a memory stick, or the like).

Preferably, the washing controller 14 in the washing machine body and the broadcast signal controller 44 are interconnected via a serial communication line such that data communication is enabled between the washing machine body and the broadcast signal reception module.

With this configuration, while the washing mode is performed by the washing machine body, the current washing progress state can be outputted through the image output unit 45 of the broadcast signal reception module through the data communication between the washing machine body and the broadcast signal reception module.

In the present embodiment, the washing machine further comprises a remote controller 30 for inputting control commands to the washing machine body and broadcast signal reception module. The remote controller 30 and the key input unit 11 in the washing machine body are the same in construction and operation as those in the above-stated washing machine with the fixed broadcast signal reception module.

A description will hereinafter be given of the operation of the washing machine with the mobile broadcast signal reception module according to the third embodiment of the present invention, constructed as stated above.

First, in the washing machine body, the washing controller 14 controls the load driver 16 to drive loads necessary for the washing mode in consideration of washing mode conditions inputted by the user or mode states sensed by the sensor unit 12.

At this time, the washing controller 14 displays current mode conditions in progress or a current washing progress state through the display unit 15 of the washing machine body.

Further, the washing controller 14, in communication with the broadcast signal controller 44, determines the state of the broadcast signal reception module and then transfers information regarding the current washing progress state to the broadcast signal controller 44 when the broadcast signal reception module is in a stand-by mode or image output state.

Meanwhile, in the mobile broadcast signal reception module, the user, through the key input unit 42, powers on the broadcast signal reception module and then requests a desired multimedia content to be watched from the broadcasting transmission center.

Then, a digital multimedia broadcast signal, received from the broadcasting transmission center in response to the user's request, is tuned and demodulated into a predefined transport stream (for example, MPEG-2) format by the tuner.

The demodulated transport stream is separated into a video signal and an audio signal and then transferred to the broadcast signal controller 44 by the demultiplexer.

The broadcast signal controller 44 receives the video signal and audio signal from the set-top box 41, processes the received signals into signals that can be outputted, and outputs the processed signals to the image output unit 45 and audio output unit 46, respectively.

The broadcast signal controller 44 also receives the washing progress state information of the washing machine body in communication with the washing controller 14 and processes the received washing progress state information into a signal that can be outputted to the image output unit 45.

At this time, when the broadcast signal reception module is in the stand-by mode where no multimedia content is outputted, the broadcast signal controller 44 displays only the washing progress state information on a specific display area of the image output unit 45. However, when the broadcast signal reception module is in a video signal output state, the broadcast signal controller 44 mixes a video signal with the washing progress state information to output them together.

As stated above, in the present embodiment, the broadcast signal reception module which receives a mobile broadcast signal is installed in the washing machine. Therefore, the user can watch a mobile broadcast on the washing machine.

On the other hand, in the case where a washing machine is installed and used in a separate space, such as the outdoors or the basement of a house, a monitor device may be used to remotely control and monitor the washing machine.

FIG. 7 is a perspective view showing a fourth embodiment of the washing machine according to the present invention, which has a monitor device with the broadcast signal reception function, and FIG. 8 is a block diagram showing the configuration of the monitor device with the broadcast signal reception function.

In the present embodiment, the washing machine, denoted by reference numeral 100, is connected with the monitor device, denoted by reference numeral 200, via a communication line.

The monitor device 200 is installed in the living space of the house such that it can be more readily used by the user at a shorter distance therefrom. As a result, the monitor device 200 can not only remotely control the distant washing machine 100 from within the house in communication with the washing machine 100, but also check washing-associated information received from the washing machine 100 and output a washing progress state including washing mode conditions, the remaining mode time, mode errors, mode start/end, etc. in various forms image or audio).

Particularly, in the present embodiment, the broadcast signal reception function is additionally provided in the monitor device 200 which is means for the remote control and monitoring of the washing machine 100.

To this end, the monitor device 200 includes a communication unit 210 for transmitting a control command to the washing machine 100 or receiving state information of the washing machine 100 therefrom in communication with the washing machine 100, a broadcast signal receiver 220 for receiving an external broadcast signal and separating the received broadcast signal into a video signal and an audio signal, an image output unit 250 for displaying the state information of the washing machine received through the communication unit 210 and the video signal separated by the broadcast signal receiver 220, an audio output unit 260 for outputting the state information of the washing machine received through the communication unit 210 and the audio signal separated by the broadcast signal receiver 220, and a monitor controller 240 for outputting the washing machine state information or broadcast signal through the image output unit 250 or audio output unit 260 by communicating with the washing machine 100 or performing the broadcast signal reception function in response to a control command from the user.

Preferably, the broadcast signal includes a mobile broadcast signal, as well as a fixed broadcast signal, such as a TV signal, DMB signal, and so forth.

The communication unit 210 is a communication module capable of performing communication, for example, a power line modem. This communication unit 210 can perform data communication with the washing machine 100 without using a network such as a gateway or a communication network such as the Internet.

The monitor controller 240 is equipped with an application program to perform the broadcast signal reception function, as well as the data communication with the washing machine 100.

The monitor device 200 includes the audio output unit 260 to output the washing machine state information in the form of an audio signal and the audio signal of the broadcast signal. The audio output unit 260 is installed in the side or front plate of a cabinet constituting the outer appearance of the monitor device 200.

The image output unit 250 includes a liquid crystal display (LCD), a plasma display panel (PDP), or the like to display the state information of the washing machine and the video signal of the broadcast signal.

A key input unit 230 is provided to receive a control command signal based on a key operation of the user and transfer it to the monitor controller 240. A key panel for washing-associated control and a key panel for control of the broadcast signal reception function are together provided in the key input unit 230.

In order to remotely control the monitor device 200, a remote controller (not shown) may be provided which has the same key panels as those of the key input unit 230.

A description will hereinafter be given of the operation of the washing machine with the broadcast signal reception function according to the fourth embodiment of the present invention, constructed as stated above.

First, if the user operates the key input unit 230 of the monitor device 200 to select a desired channel to be watched, the broadcast signal receiver 220 tunes, or receives, a broadcast signal of the selected channel under the control of the monitor controller 240. The broadcast signal receiver 220 then separates the received broadcast signal into a video signal and an audio signal and outputs the separated video and audio signals.

Thereafter, the monitor controller 240 receives the video signal and audio signal from the broadcast signal receiver 220, processes the received signals into signals that can be outputted, and outputs the processed signals to the image output unit 250 and audio output unit 260, respectively.

Meanwhile, if the state information of the washing machine 100 is received through the communication unit 210, the monitor controller 240 mixes the received washing machine state information with the video signal being currently displayed through the image output unit 250 to output them together.

For example, provided in a display area of the image output unit 250 may be a PIP function which configures the video signal resulting from TV reception as a main picture and the received washing machine state information as a sub-picture.

Alternatively, a caption area may be provided under the display area of the image output unit 250 to display the washing machine state information in the form of a caption.

For the display of the washing machine state using the image output unit 250, the monitor controller 240 may successively display the washing machine state information by performing data communication with the washing machine 100 in real time, or selectively display the washing machine state information by communicating with the washing machine 100 only when there is a request from the user.

On the other hand, in the case where the state information received from the washing machine 100 is an audio signal, it is outputted through the audio output unit 260 under the control of the monitor controller 240.

For example, when a mode error, such as eccentricity, occurs in the washing machine 100 or the washing mode is ended, the resulting signal is transmitted to the monitor controller 240 and then outputted through the audio output unit 260 in the form of a voice error message or buzzer sound under the control of the monitor controller 240.

As described above, in the present embodiment, the broadcast signal reception function is additionally provided in the monitor device which remotely controls the washing machine. Therefore, through the monitor device, not only state information of the washing machine can be displayed, but also a broadcast signal can be watched by the user.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A broadcasting receiver-equipped washing machine for washing or drying laundry, the washing machine comprising a broadcast signal reception module arranged thereon for receiving a broadcast signal and providing the received broadcast signal in image and audio form, wherein the broadcast signal reception module includes:
   a key input unit for inputting control commands for control of image/audio output from a user;
   a broadcast signal receiver for receiving an external fixed broadcast signal and separating the received broadcast signal into a video signal and an audio signal;
   an image output unit for displaying the video signal separated by the broadcast signal receiver and a current washing progress state of the washing machine;
   an audio output unit for outputting the audio signal separated by the broadcast signal receiver; and
   a broadcast signal controller for controlling the image/audio output in response to the user's control commands and displaying the washing progress state through the image output unit in data communication with the washing machine, and
   wherein the image output unit is physically or functionally partitioned into an image display area for outputting the video signal, and a washing display area for displaying the washing progress state, whereby the image output unit displays the video signal and the washing progress state independent of each other or at the same time.

2. The broadcasting receiver-equipped washing machine according to claim 1, further comprising a remote controller for inputting control commands from a user to the washing machine and broadcast signal reception module.

3. The broadcasting receiver-equipped washing machine according to claim 2, wherein the remote controller includes a key panel for control of the washing machine, and a key panel for control of the broadcast signal reception module, whereby the remote controller is used in common for the washing machine and broadcast signal reception module.

4. The broadcasting receiver-equipped washing machine according to claim 1, wherein the washing machine and the broadcast signal reception module are interconnected via a serial communication line so that they can perform data communication therebetween.

5. The broadcasting receiver-equipped washing machine according to claim 1, wherein the washing machine includes:
   a key input unit for inputting washing mode conditions from a user;
   a load driver for driving loads necessary for a washing mode; and
   a washing controller for controlling the washing mode according to the washing mode conditions inputted from the user and transmitting information regarding a current washing progress state to the broadcast signal reception module to display the current washing progress state through the broadcast signal reception module.

6. The broadcasting receiver-equipped washing machine according to claim 5, wherein the washing machine further includes an Internet-connectable communication unit.

7. The broadcasting receiver-equipped washing machine according to claim 5, wherein the key input unit includes:
   a washing operator for performing a variety of washing-associated operations; and
   a broadcasting operator for performing various operations associated with output of the broadcast signal.

8. The broadcasting receiver-equipped washing machine according to claim 7, wherein the broadcasting operator includes a plurality of select keys for operating use environments of the broadcast signal reception module including power control, screen adjustment, channel selection and volume adjustment.

9. The broadcasting receiver-equipped washing machine according to claim 7, wherein the washing operator and the broadcasting operator constitutes a common key panel.

10. The broadcasting receiver-equipped washing machine according to claim 9, wherein the key input unit further includes a mode select key for selecting any one of a washing-associated operation mode or a broadcast signal output-associated operation mode on the key panel.

11. The broadcasting receiver-equipped washing machine according to claim 1, wherein the washing machine includes:
   a key input unit for inputting washing mode conditions from a user;
   a load driver for driving loads necessary for a washing mode;
   a display unit for displaying current mode conditions in progress and a current washing progress state; and
   a washing controller for controlling the washing mode according to the washing mode conditions inputted from the user, and displaying the current washing progress state through the display unit or transmitting information regarding the current washing progress state to the broadcast signal reception module to display the current washing progress state through the broadcast signal reception module.

12. The broadcasting receiver-equipped washing machine according to claim 11, wherein the washing machine further includes an Internet-connectable communication unit.

13. The broadcasting receiver-equipped washing machine according to claim 1, wherein the image output unit includes a washing information display panel for displaying only the washing progress state separately from the video signal.

14. The broadcasting receiver-equipped washing machine according to claim 13, wherein the image output unit displays the washing progress state in the form of a picture in picture (PIP) screen or caption together with the video signal under the control of the broadcast signal controller.

15. The broadcasting receiver-equipped washing machine according to claim 1, wherein the broadcast signal reception module includes:
   a key input unit for inputting control commands for control of image/audio output from a user;
   a set-top box for receiving an external mobile broadcast signal and separating the received broadcast signal into a video signal and an audio signal;
   an image output unit for displaying the video signal separated by the set-top box and a current washing progress state of the washing machine;
   an audio output unit for outputting the audio signal separated by the set-top box; and
   a broadcast signal controller for controlling the image/audio output in response to the user's control commands and displaying the washing progress state through the image output unit in data communication with the washing machine.

16. The broadcasting receiver-equipped washing machine according to claim 15, wherein the set-top box has a data transmission/reception function to enable two-way communication with a transmission center which provides the mobile broadcast signal.

17. The broadcasting receiver-equipped washing machine according to claim 15, wherein the set-top box includes:
a tuner for receiving, tuning and demodulating the mobile broadcast signal from a broadcasting transmission center; and
a demultiplexer for separating the mobile broadcast signal demodulated by the tuner into the video signal and the audio signal.

18. The broadcasting receiver-equipped washing machine according to claim 17, wherein the set-top box further includes a storage medium for storing the received mobile broadcast signal.

19. The broadcasting receiver-equipped washing machine according to claim 15, wherein the image output unit includes a washing information display panel for displaying only the washing progress state separately from the video signal.

20. The broadcasting receiver-equipped washing machine according to claim 19, wherein the image output unit displays the washing progress state in the form of a PIP screen or caption together with the video signal under the control of the broadcast signal controller.

21. A broadcasting receiver-equipped washing machine for washing or drying laundry, the washing machine comprising a monitor device communicably connected therewith for remotely controlling and monitoring an entire operation of the washing machine, the monitor device receiving a broadcast signal and outputting the received broadcast signal in image and audio form, in response to a user's request, wherein the monitor device includes:
a communication unit for transmitting a control command to the washing machine or receiving information regarding a current washing progress state of the washing machine therefrom in data communication with the washing machine;
a broadcast signal receiver for receiving an external broadcast signal and separating it into a video signal and an audio signal;
an image output unit for displaying the washing progress state information received through the communication unit and the video signal separated by the broadcast signal receiver;
an audio output unit for outputting the washing progress state information received through the communication unit and the audio signal separated by the broadcast signal receiver; and
a monitor controller for outputting the washing progress state information or broadcast signal by performing the data communication with the washing machine or a broadcast signal reception function in response to a control command from the user, and
wherein the image output unit is physically or functionally partitioned into an image display area for outputting the video signal, and a washing display area for displaying the washing progress state, whereby the image output unit displays the video signal and the washing progress state independent of each other or at the same time.

22. The broadcasting receiver-equipped washing machine according to claim 21, wherein the washing machine and the monitor device perform the data communication therebetween in any one of a power line communication (PLC) manner or radio frequency (RF) communication manner.

23. The broadcasting receiver-equipped washing machine according to claim 21, wherein the communication unit includes any one of a PLC module or RF communication module.

24. The broadcasting receiver-equipped washing machine according to claim 21, wherein the monitor device further includes a key input unit, the key input unit including a washing operator for performing a variety of washing-associated operations, and a broadcasting operator for performing various operations associated with output of the broadcast signal.

25. The broadcasting receiver-equipped washing machine according to claim 24, wherein the broadcasting operator includes a plurality of select keys for operating use environments of the monitor device including power control, screen adjustment, channel selection and volume adjustment.

26. The broadcasting receiver-equipped washing machine according to claim 24, wherein the washing operator and the broadcasting operator constitutes a common key panel.

27. The broadcasting receiver-equipped washing machine according to claim 26, wherein the key input unit further includes a mode select key for selecting any one of a washing-associated operation mode or a broadcast signal output-associated operation mode on the key panel.

28. The broadcasting receiver-equipped washing machine according to claim 21, wherein the image output unit includes a washing information display panel for displaying only the washing progress state separately from the video signal.

29. The broadcasting receiver-equipped washing machine according to claim 28, wherein the image output unit displays the washing progress state in the form of a PIP screen or caption together with the video signal under the control of the monitor controller.

30. The broadcasting receiver-equipped washing machine according to claim 21, wherein the broadcast signal received by the broadcast signal receiver is a fixed broadcast signal or mobile broadcast signal.

31. The broadcasting receiver-equipped washing machine according to claim 21, wherein the monitor device further includes a storage medium for storing the broadcast signal received by the broadcast signal receiver.

* * * * *